(12) United States Patent
Ganesan et al.

(10) Patent No.: US 12,149,369 B2
(45) Date of Patent: Nov. 19, 2024

(54) METHOD AND SYSTEM FOR OPERATING A SECURITY SYSTEM THAT HAS A CELLULAR COMMUNICATION CONNECTION WITH A DATA USAGE CAP

(71) Applicant: Honeywell International Inc., Charlotte, NC (US)

(72) Inventors: Balamurugan Ganesan, Bengaluru (IN); Jebina Elsie Thanasingh, Madurai (IN); Surekha Deshpande, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 360 days.

(21) Appl. No.: 17/751,087

(22) Filed: May 23, 2022

(65) Prior Publication Data

US 2023/0379182 A1 Nov. 23, 2023

(51) Int. Cl.
*H04M 15/00* (2024.01)
*H04L 12/14* (2006.01)

(52) U.S. Cl.
CPC ...... *H04L 12/1435* (2013.01); *H04M 15/885* (2013.01)

(58) Field of Classification Search
CPC ............................... H04M 15/00; H04L 12/14
See application file for complete search history.

(56) References Cited

U.S. PATENT DOCUMENTS

| | | |
|---|---|---|
| 8,706,863 B2 | 4/2014 | Fadell |
| 10,499,214 B2 | 12/2019 | Dulick |
| 2010/0017506 A1 | 1/2010 | Fadell |
| 2013/0196615 A1 | 8/2013 | Zalmanovitch et al. |
| 2015/0350956 A1 | 12/2015 | Bell et al. |
| 2017/0126902 A1 | 5/2017 | Bradley et al. |
| 2017/0193395 A1 | 7/2017 | Limonad et al. |
| 2018/0145896 A1 | 5/2018 | Zalmanovitch et al. |
| 2022/0408315 A1* | 12/2022 | Raghuvanshi ...... H04L 41/0894 |
| 2022/0415149 A1* | 12/2022 | Albero ................. G08B 29/186 |
| 2022/0417768 A1* | 12/2022 | Yao ........................ H04W 24/02 |

OTHER PUBLICATIONS

Extended European Search Report, EP Application No. 23171828.9, European Patent Office, Oct. 13, 2023 (10 pages).

* cited by examiner

*Primary Examiner* — Michael T Vu
(74) *Attorney, Agent, or Firm* — Seager, Tufte & Wickhem, LLP

(57) ABSTRACT

A method for improving the reliability of a security system includes determining an amount of cellular communication data usage over a cellular communication connection since the beginning of a predefined period of time and a remaining amount of cellular communication data for the remainder of the predefined period of time based at least in part on the amount of cellular communication data usage over the cellular communication connection since the beginning of the predefined period of time and a predefined cellular data usage cap for the predefined period of time. When a determination is made that a projected amount of cellular communication data usage is expected to exceed the predefined cellular data usage cap at or before the end of the predefined period of time, one or more operations of the security system are changed to reduce the amount of cellular communication data usage by the security system.

20 Claims, 7 Drawing Sheets

METHOD AND SYSTEM FOR OPERATING A SECURITY SYSTEM THAT HAS A CELLULAR COMMUNICATION CONNECTION WITH A DATA USAGE CAP

TECHNICAL FIELD

The present disclosure pertains generally to security systems and more particularly to systems and methods for operating a security system having a cellular communication connection with a data usage cap.

BACKGROUND

A security system may include a number of security sensors within a monitored area. The monitored area may be indoors or outdoors, for example. Each of the security sensors may communicate with a security panel, for example. Each of the security panels may communicate with a remote monitoring station. Cellular communication may be used for at least some of the communication between the security panels and the remote monitoring stations. The security panels may also rely upon cellular communication for receiving updates, configurations and the like from a remote cloud-based server (distinct from the remote monitoring stations). In many cases, the cellular communication used to configure and operate the security systems, including the security panels and the communication between the security panels and other computers, may have data usage limits. In some cases, these data usage limits are the result of relying upon prepaid cellular communication data cards.

It will be appreciated that in some cases, particularly with the usage of prepaid cellular communication data cards, that a security system could approach or even reach a situation in which the security system is not able to appropriately function because it no longer has sufficient remaining available data usage to communicate as the system needs to communication. What would be beneficial are improved methods and system for operating a security system having a cellular communication connection with a data usage cap.

SUMMARY

This disclosure relates generally to methods and system for operating a security system having a cellular communication connection with a data usage cap. This may including monitoring remaining available cellular data and using the remaining available cellular data more efficiently. An example may be found in a method for improving the reliability of a security system that includes an on-site security panel and an off-site central monitoring station (CMS). The security panel and the CMS communicate over a cellular communication connection that has a predefined cellular data usage cap over a predefined period of time (e.g. 100 Megabytes per month). The illustrative method includes determining an amount of cellular communication data usage over the cellular communication connection since the beginning of the predefined period of time and determining a remaining amount of cellular communication data for the remainder of the predefined period of time based at least in part on the amount of cellular communication data usage over the cellular communication connection since the beginning of the predefined period of time and the predefined cellular data usage cap for the predefined period of time. A determination is made as to whether a projected amount of cellular communication data usage is expected to exceed the predefined cellular data usage cap at or before the end of the predefined period of time based at least in part on the remaining amount of cellular communication data and how much time remains before the end of the predefined period of time. In response to determining that the projected amount of cellular communication data usage is expected to exceed the predefined cellular data usage cap at or before the end of the predefined period of time, one or more operations of the security system are changed to reduce the amount of cellular communication data usage by the security system to prolong at least basic functionality of the security system.

Another example may be found in a method for operating a security panel of a security system, wherein the security panel is in communication with an off-site central monitoring station (CMS) and/or a cloud-based server over a cellular communication connection that has a predefined cellular data usage cap over a predefined period of time. The illustrative method includes the security panel determining an amount of cellular communication data usage over the cellular communication connection since the beginning of the predefined period of time, and determining a remaining amount of cellular communication data for the remainder of the predefined period of time based at least in part on the amount of cellular communication data usage over the cellular communication connection since the beginning of the predefined period of time and the predefined cellular data usage cap for the predefined period of time. The security panel determines whether a projected amount of cellular communication data usage is expected to exceed the predefined cellular data usage cap at or before the end of the predefined period of time based at least in part on the remaining amount of cellular communication data and how much time remains before the end of the predefined period of time. In response to determining that the projected amount of cellular communication data usage is expected to exceed the predefined cellular data usage cap at or before the end of the predefined period of time, the security panel changes one or more operations of the security panel to reduce the amount of cellular communication data usage.

Another example may be found in a non-transient computer readable storage medium having instructions stored thereon. When the instructions are executed by one or more processors of a security system, the one or more processors are caused to determine an amount of cellular communication data usage over a cellular communication connection between a security panel and one or more off-site central monitoring stations (CMS) and/or a cloud-based server since the beginning of a predefined period of time, wherein the cellular communication connection has a predefined cellular data usage cap over the predefined period of time. The one or more processors are caused to determine a remaining amount of cellular communication data for the remainder of the predefined period of time based at least in part on the amount of cellular communication data usage over the cellular communication connection since the beginning of the predefined period of time and the predefined cellular data usage cap for the predefined period of time. The one or more processors are caused to determine whether a projected amount of cellular communication data usage is expected to exceed the predefined cellular data usage cap at or before the end of the predefined period of time based at least in part on the remaining amount of cellular communication data and how much time remains before the end of the predefined period of time. In response to determining that the projected amount of cellular communication data usage is expected to exceed the predefined cellular data usage cap at or before the end of the predefined period of time, the one or more processors are caused to automatically change or recommend a change to one or more operations of the security system to reduce the amount of cellular communication data usage by the security system.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
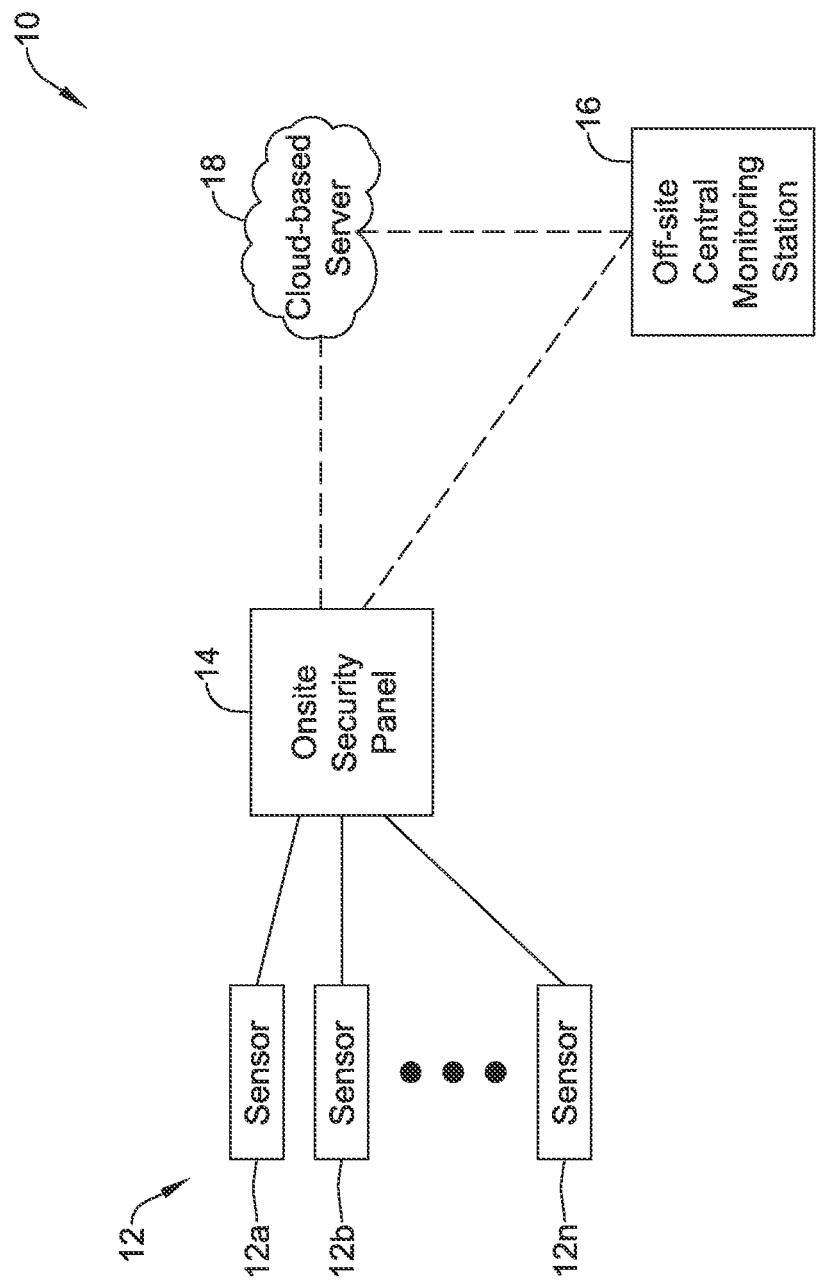
FIG. 1 is a schematic block diagram of an illustrative security system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative security system 10. The illustrative security system 10 includes a number of sensors 12, individually labeled as 12a, 12b, and through 12n. It will be appreciated that the security system 10 may include any number of sensors 12. The sensors 12 may include a variety of different types of sensors, such as but not limited to door open sensors, window open sensors, PIR (passive infrared) and other motion sensors, glass break detectors, and the like.

Each of the sensors 12 may be configured to communicate with an on-site security panel 14 using any of a variety of wired or wireless communication protocols. The sensors 12 may provide signals to the on-site security panel 14 reporting what, if any, each of the sensors 12 may have detected or sensed. In some cases, the on-site security panel 14 may provide instructions to at least some of the sensors 12, such as but not limited to instructing at least some of the sensors 12 to activate at a particular time, or to turn off at another particular time, for example. In some cases, the sensors 12 report to the on-site security panel 14, but the received signals may be ignored by the on-site security panel 14 during times in which the security system 10 is not armed.

The on-site security panel 14 may communicate with an off-site central monitoring station (CMS) 16. In some cases, the on-site security panel 14 may communicate alarms or possible alarms to the CMS 16. While only one CMS 16 is shown, it will be appreciated that in some cases the security system 10 may include more than one CMS 16. For example, the security system 10 may be spread between multiple facilities, with each on-site security panel 14 (or multiple on-site security panels 14) reporting to a different CMS 16. In some instances, multiple CMS 16 may be arranged in a hierarchal manner, with perhaps lower level CMS 16 each communicating with one or more on-site security panels 14, with the lower level CMS 16 each communicating with a higher level CMS 16. This is just an example.

In some cases, the on-site security panel 14 may communicate with a cloud-based server 18. In some cases, the cloud-based server 18 may communicate system configuration information to the on-site security panel 14. The cloud-based server 18 may periodically provide system updates to the on-site security panel 14, for example. In some instances, the CMS 16 may also communicate with the cloud-based server 18. In some cases, the functions of the CMS 16 and the functions of the cloud-based server 18 may be merged into a single block. In some cases, the CMS 16 may be hosted by the cloud-based server 18.

Communication between the on-site security panel 14 and the CMS 16, and communication between the on-site security panel 14 and the cloud-based server 18 may include a cellular communication link. In some cases, communication between the CMS 16 and the cloud-based server 18 may be cellular-based, but this is not required. Indicating that communication between any of the on-site security panel 14, the CMS 16 and the cloud-based server 18 is cellular-based means that at least a leg of the communication path between the devices occurs over a cellular network. It will be appreciated that in some cases, the on-site security panel 14 and the CMS 16, for example, may communicate directly with each other using only a cellular network. In some cases, at least some communication, or portions thereof, between the on-site security panel 14 and the CMS 16 may occur over a cellular network while other communication, or portions thereof, may occur over other networks, including but not limited to a local area network (LAN) or a wide area network (WAN).

Figure 2:
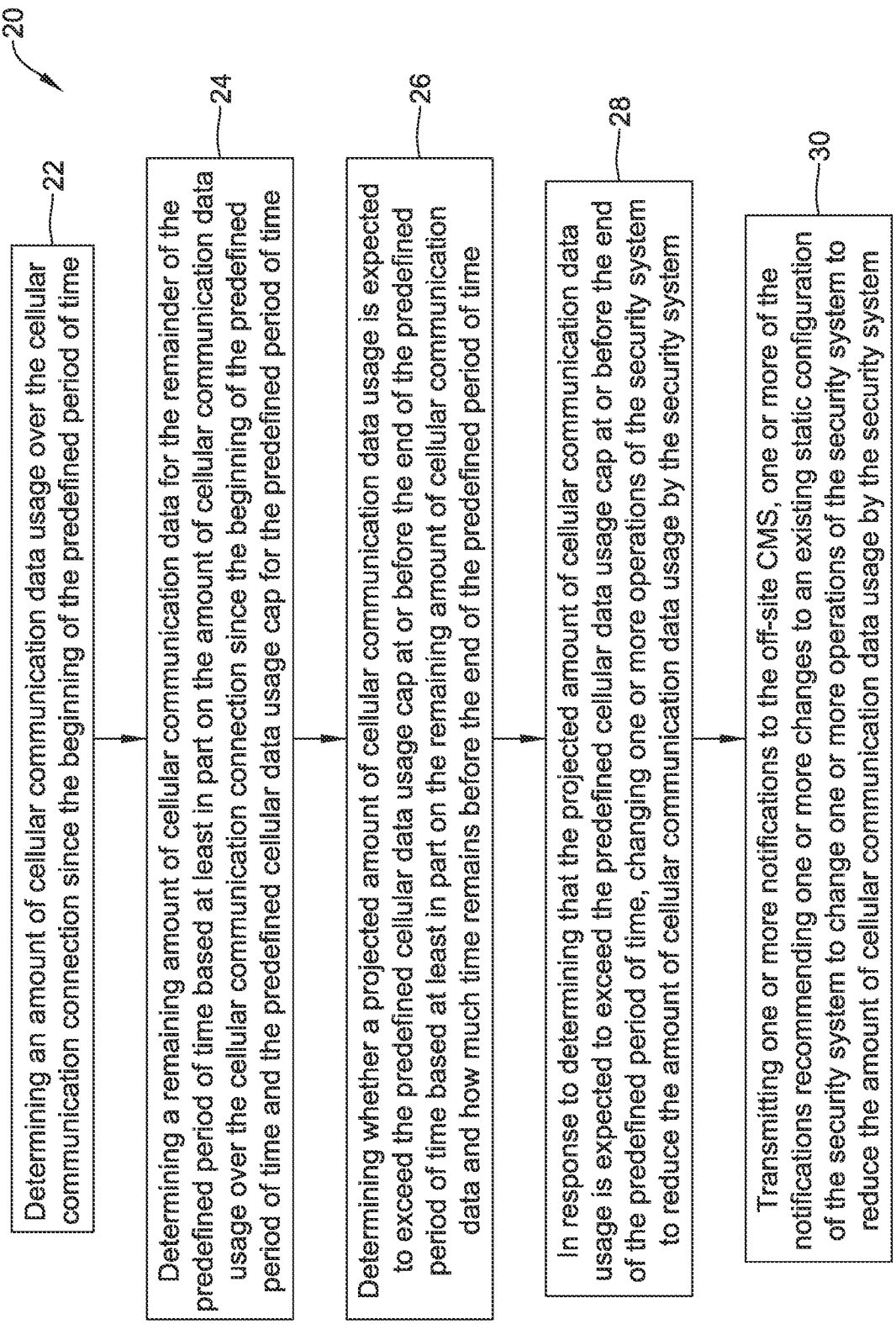
FIG. 2 is a flow diagram showing an illustrative method.
Figure 3:
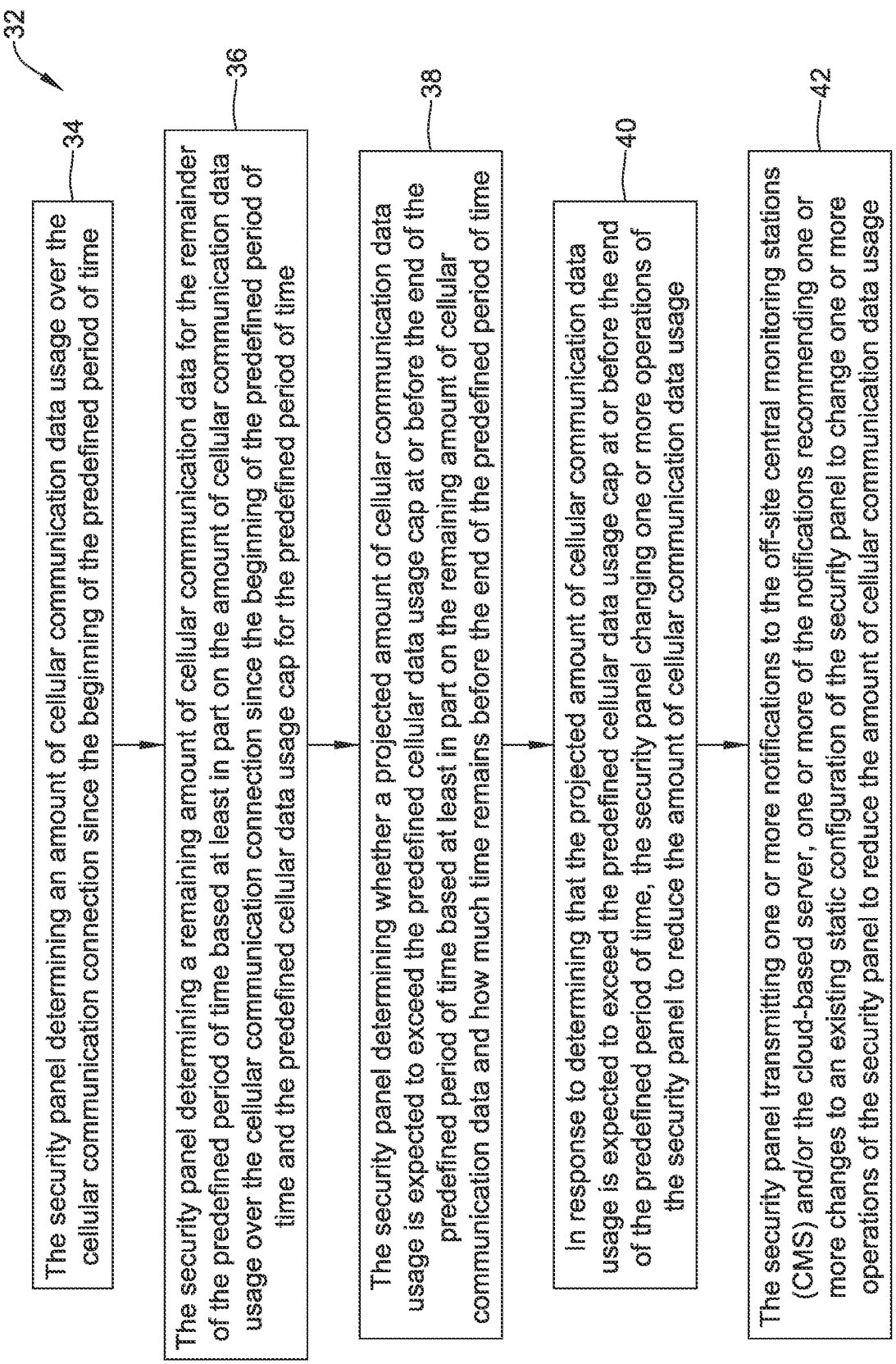
FIG. 3 is a flow diagram showing an illustrative method.
Figure 4:
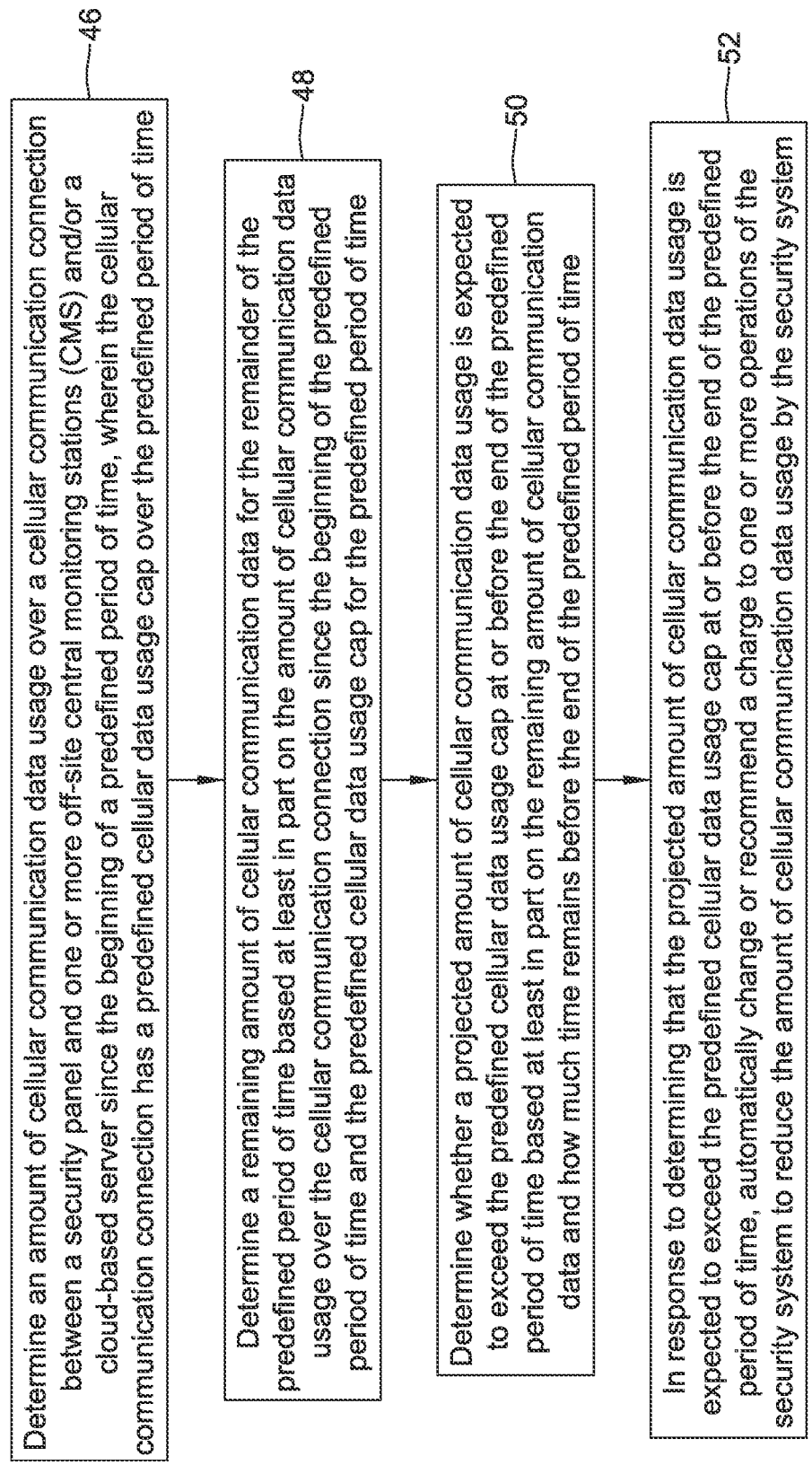
FIG. 4 is a flow diagram showing an illustrative method.

In some cases, at least some cellular communication between components of the security system 10 may utilize pre-paid cellular data plans that have predefined cellular data usage caps, or limits. Such caps or limits are often associated with Internet-of-Things Sim Cards (IoT SIM cards). In some cases, and as a result, it is possible that the security system 10, or portions thereof, may run low on available cellular data. If the security system 10 runs too low on available cellular data, the security system 10 may not be able to function as it is intended to function. Accordingly, the security system 10 may employ methods of tracking and sometime learning its cellular data consumption, and can compare that with remaining cellular data. If appropriate, the security system 10 may implement various changes to conserve cellular data usage to prolong at least basic functionality of the security system. FIGS. 2 through 4 are flow diagrams showing examples of illustrative methods by which the security system 10 may do so.

FIG. 2 is a flow diagram showing an illustrative method 20 for improving the reliability of a security system (such as the security system 10) that includes an on-site security panel (such as the on-site security panel 14) and an off-site central monitoring station (CMS) (such as the CMS 16), the security panel and the CMS communicating over a cellular communication connection that has a predefined cellular data usage cap over a predefined period of time (e.g. 100 Megabytes per month). Communication between the on-site security panel and the CMS are considered to communicate over a cellular connection when at least a leg of the communication path occurs over a cellular network. The illustrative method 20 includes determining an amount of cellular communication data usage over the cellular communication connection since the beginning of the predefined period of time (e.g. beginning of the month), as indicated at block 22.

A remaining amount of cellular communication data for the remainder of the predefined period of time (e.g. remainder of the month) is determined based at least in part on the amount of cellular communication data usage over the cellular communication connection since the beginning of the predefined period of time and the predefined cellular data usage cap for the predefined period of time, as indicated at block 24. In some cases, determining the projected amount of cellular communication data usage may be based at least in part on a historical record of past cellular communication data usage during past predefined periods of time, sometimes taking into consideration data usage rates during different times during the past predefined periods of time, data usage rates during different days of the week, data usage rates during different times of year, data usage rates during different holidays, data usage rates when the security system is set at different security levels, and/or any other suitable factors. In some cases, the projected amount of cellular communication data usage is based on a data usage pattern study. In some cases, determining the projected amount of cellular communication data usage may be based at least in part on a machine learning model that is trained using the historical record of past cellular communication data usage.

A determination is made as to whether a projected amount of cellular communication data usage is expected to exceed the predefined cellular data usage cap at or before the end of the predefined period of time based at least in part on the remaining amount of cellular communication data and how much time remains before the end of the predefined period of time, as indicated at block 26.

In response to determining that the projected amount of cellular communication data usage is expected to exceed the predefined cellular data usage cap at or before the end of the predefined period of time, one or more operations of the security system are changed to reduce the amount of cellular communication data usage by the security system, as indicated at block 28. In some instances, the method 20 may further include transmitting one or more notifications to the off-site CMS. One or more of the notifications may recommend one or more changes to an existing static configuration of the security system, which change one or more operations of the security system to reduce the amount of cellular communication data usage by the security system.

In some cases, changing one or more operations of the security system to reduce the amount of cellular communication data usage by the security system may include reducing an amount of diagnostic data that is communicated over the cellular communication connection by the security system. As an example, reducing the amount of diagnostic data may include eliminating a type of diagnostic data that is communicated over the cellular communication connection by the security system.

Changing one or more operations of the security system to reduce the amount of cellular communication data usage by the security system may include reducing an amount of operational data that is communicated over the cellular communication connection by the security system. As an example, reducing the amount of operational data may include eliminating a type of operational data that is communicated over the cellular communication connection by the security system. In some cases, changing one or more operations of the security system to reduce the amount of cellular communication data usage by the security system may include reducing an amount of maintenance data that is communicated over the cellular communication connection by the security system. As an example, reducing the amount of maintenance data may include eliminating a type of maintenance data that is communicated over the cellular communication connection by the security system.

Changing one or more operations of the security system to reduce the amount of cellular communication data usage by the security system may include changing one or more communication parameters used by the security system when communicating over the cellular communication connection. As an example, changing one or more communication parameters may include reducing a number or retries and/or increasing an interval between retries over the cellular communication connection before a communication is considered to have failed. As another example, changing one or more communication parameters may include increasing an update interval for sending updated operational data over the cellular communication connection, or increasing the interval between watchdog pings between devices.

FIG. 3 is a flow diagram showing an illustrative method 32 for operating a security panel (such as the on-site security panel 14) of a security system (such as the security system 10), wherein the security panel is in communication with an off-site central monitoring station (CMS) (such as the CMS 16) and/or a cloud-based server (such as the cloud-based server 18) over a cellular communication connection that has a predefined cellular data usage cap over a predefined period of time. The illustrative method 32 includes the security panel determining an amount of cellular communication data usage over the cellular communication connection since the beginning of the predefined period of time, as indicated at block 34. The security panel determines a remaining amount of cellular communication data for the remainder of the predefined period of time based at least in part on the amount of cellular communication data usage over the cellular communication connection since the beginning of the predefined period of time and the predefined cellular data usage cap for the predefined period of time, as indicated at block 36.

The security panel determines whether a projected amount of cellular communication data usage is expected to exceed the predefined cellular data usage cap at or before the end of the predefined period of time based at least in part on the remaining amount of cellular communication data and how much time remains before the end of the predefined period of time, as indicated at block 38. In some cases, determining the projected amount of cellular communication data usage is based at least in part on a historical record of past cellular communication data usage. Determining the projected amount of cellular communication data may be is based at least in part on a machine learning model that is trained using the historical record of past cellular communication data usage. In response to determining that the projected amount of cellular communication data usage is expected to exceed the predefined cellular data usage cap at or before the end of the predefined period of time, the security panel changes one or more operations of the security panel to reduce the amount of cellular communication data usage, as indicated at block 40.

In some cases, the method 32 may further include the security panel transmitting one or more notifications to the off-site central monitoring stations (CMS) and/or the cloud-based server. One or more of the notifications may recommend one or more changes to an existing static configuration of the security panel to change one or more operations of the security panel to reduce the amount of cellular communication data usage, as indicated at block 42. In some cases, changing one or more operations of the security panel to reduce the amount of cellular communication data usage may include one or more of reducing an amount of diagnostic data that is communicated over the cellular communication connection, reducing an amount of operational data that is communicated over the cellular communication connection, and/or reducing an amount of maintenance data that is communicated over the cellular communication connection. In some instances, changing one or more operations of the security panel to reduce the amount of cellular communication data usage may include changing one or more communication parameters used by the security panel when communicating over the cellular communication connection. In some cases, the security panel may automatically change one or more operations of the security panel to reduce the amount of cellular communication data usage.

FIG. 4 is a flow diagram showing an illustrative series of steps 44 that may be carried out by one or more processors of a security system such as the security system 10 when executing a set of executable instructions saved on a non-transient, computer-readable storage medium. The one or more processors may be disposed within the on-site security panel 14, for example. The one or more processors may be disposed within the CMS 16, or even within the cloud-based server 18. In some cases, the one or more processors may include two or more processors distributed among two or more of the on-site security panel 14, the CMS 16 and/or the cloud-based server 18.

When executing the executable instructions, the one or more processors may be caused to determine an amount of cellular communication data usage over a cellular communication connection between a security panel and one or more off-site central monitoring stations (CMS) and/or a cloud-based server since the beginning of a predefined period of time, wherein the cellular communication connection has a predefined cellular data usage cap over the predefined period of time, as indicated at block 46. A remaining amount of cellular communication data for the remainder of the predefined period of time is determined based at least in part on the amount of cellular communication data usage over the cellular communication connection since the beginning of the predefined period of time and the predefined cellular data usage cap for the predefined period of time, as indicated at block 48.

A determination is made as to whether a projected amount of cellular communication data usage is expected to exceed the predefined cellular data usage cap at or before the end of the predefined period of time based at least in part on the remaining amount of cellular communication data and how much time remains before the end of the predefined period of time, as indicated at block 50. In response to determining that the projected amount of cellular communication data usage is expected to exceed the predefined cellular data usage cap at or before the end of the predefined period of time, a change to one or more operations of the security system to reduce the amount of cellular communication data usage by the security system is automatically made or recommended, as indicated at block 52.

Figure 5:
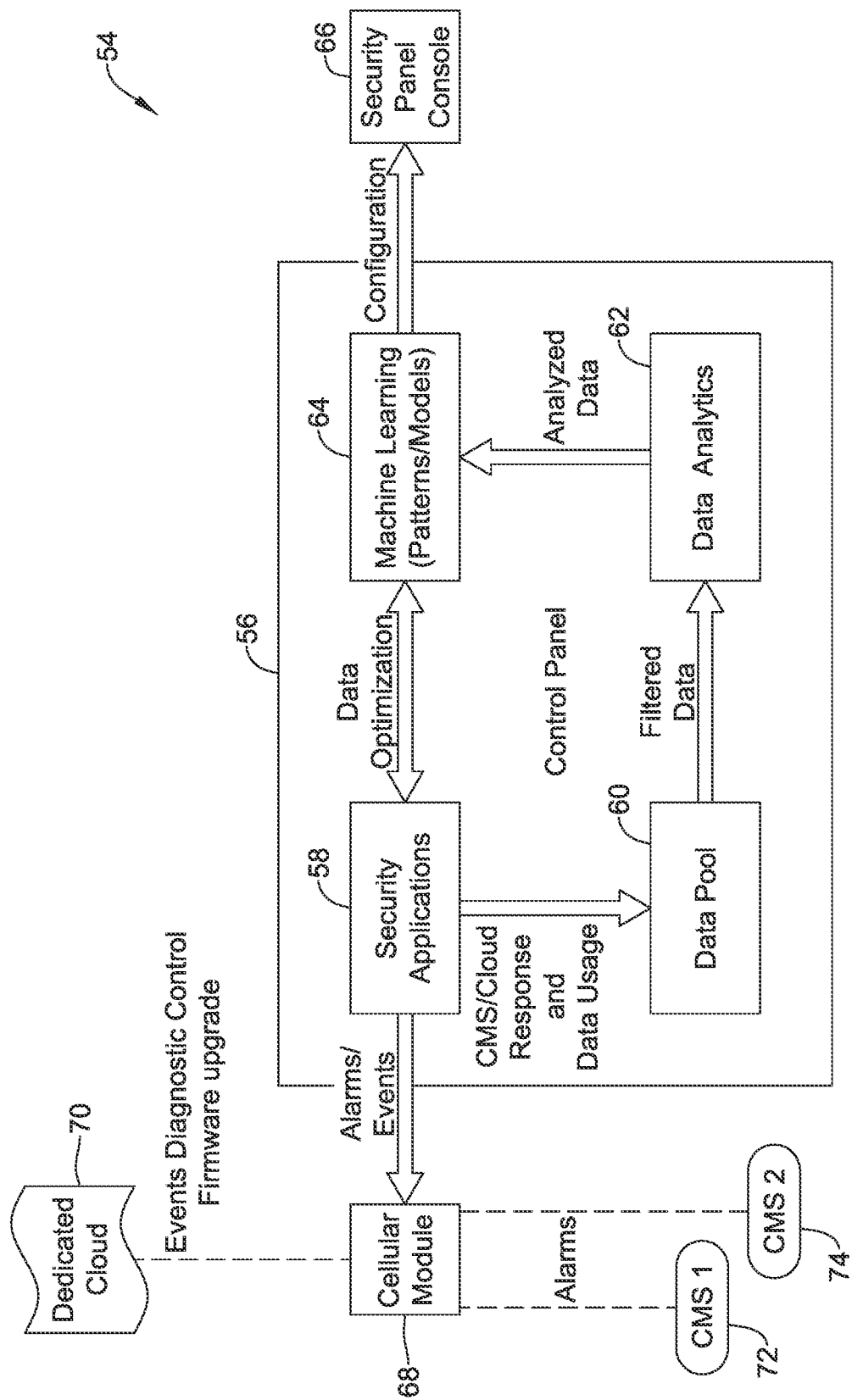
FIG. 5 is a schematic block diagram of an illustrative security system.

FIG. 5 is a schematic block diagram of an illustrative security system 54. The illustrative security system 54 may be considered as being an example of the security system 10. Any features ascribed to the security system 10 may be applicable to the security system 54. Any features ascribed to the security system 54 may be applicable to the security system 10. The illustrative security system 54 includes a control panel 56 that provides a number of features. As shown, the control panel 56 includes a security applications block 58, a data pool block 60, a data analytics block 62 and a machine learning block 64. Data usage data flows from the security applications block 58 to the data pool block 60. Filtered data flows from the data pool block 60 to the data analytics block 62. Analyzed data flows from the data analytics block 62 to the machine learning block 64. The machine learning block 64 provides configuration information to a security panel console 66.

Data optimization flows back and forth between the machine learning block 64 and the security applications block 58. The security applications block 58 communicates alarms and events to a cellular module 68, which in turn allows cellular communication between the control panel 56 and a dedicated cloud 70. This allows events information, diagnostic information, control information and firmware upgrades to be communicated from the dedicated cloud 70 to the control panel 56. The cellular module 68 also allows cellular communication between the control panel 56 and a CMS 72 and a CMS 74. In some cases, alarm information is communicated to the CMS 72 and/or the CMS 74.

Figure 6:
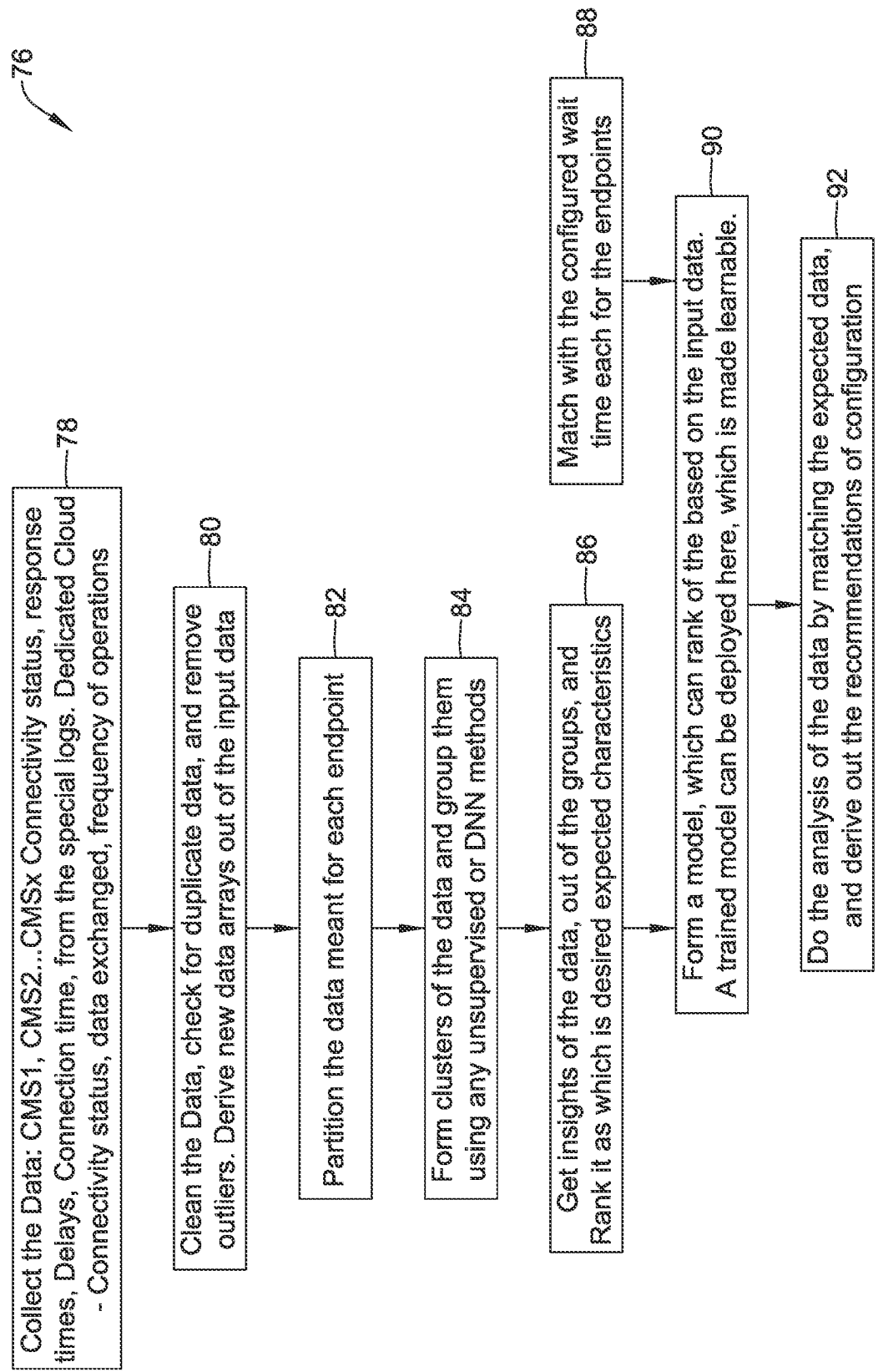
FIG. 6 is a flow diagram showing an illustrative method.

FIG. 6 is a flow diagram showing an illustrative method 76. The illustrative method 76 includes collecting data, as indicated at block 78. The data is cleaned, as indicated at block 80. The data is partitioned, as indicated at block 82. The data is formed into clusters and is grouped, as indicated at block 84. Insights are gained from the data, including ranking the data, as indicated at block 86. The data is matched, as indicated at block 88. A model is formed, as indicated at block 90. The data is analyzed, and a recommendation is determined, as indicated at block 92.

In some cases, data is filtered, and cleaned, for each endpoint, and parameters of protocol are measured, and counted for each end point. Like number of bytes in a handshake session, the delta time interval, ResetPackets count, Fin Packets count, OutOfOrder Packets Count, Alerts Count, Duplicate Acknowledgement count, ReTransmission, Alert types, Counts Of Late response, time in nanoseconds for the response, retry counts etc. These data are grouped with K Means, DNN using an unsupervised learning technique. In some cases, the data model is cleaned, checked for outliers, feature extracted and is trained with a suitable ML model like Random forest or reinforced learning models.

Figure 7:
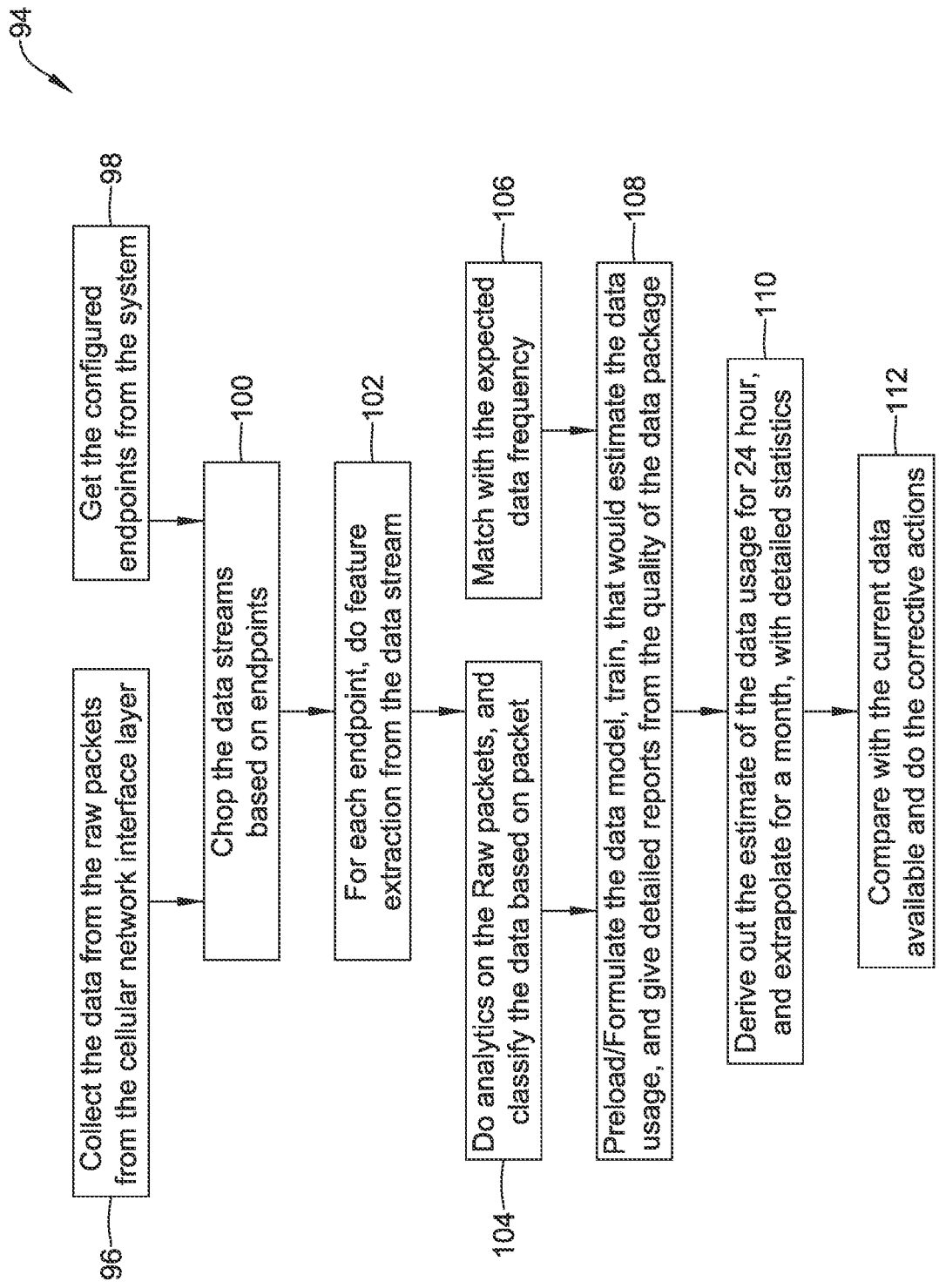
FIG. 7 is a flow diagram showing an illustrative method.

FIG. 7 is a flow diagram showing an illustrative method 94. The illustrative method 94 includes collecting data, as indicated at block 96. Configured endpoints are obtained, as indicated at block 98. The data streams are chopped, as indicated at block 100. Data is extracted, as indicated at block 102. Analytics are performed on the raw data, as indicated at block 104, and is matched with the expected data frequency, as indicated at block 106. The data model is formulated, as indicated at block 108. Projected data usage is estimated, as indicated at block 110. The projected data usage is compared with remaining data available in the data plan in order to determine corrective actions, as indicated at block 112.

In some cases, the system may have three (or more) data states including a normal data state, an optimization data state and a critical optimization data state. The system may be placed in the normal data state when the projected data usage does not indicate data usage will exceed the predefined cellular data usage cap. The system may be placed in the optimization data state when the projected data usage indicated that data usage will exceed the predefined cellular data usage cap but by less than a first data overage threshold. The system may be placed in the critical optimization data state when the projected data usage indicated that data usage will exceed the predefined cellular data usage cap by more than the first data overage threshold.

In some cases, firmware updates can be executed or postponed based on the data states. i.e., since firmware upgrades can consume a lot of data, the firmware upgrade may be allowed only in the normal data state or it can suggest (e.g. by push notification) for the user to increase the data usage cap for the current predetermined period of time to accommodate a desired firmware upgrade.

In some cases, once in the critical optimization data state, the system may prevent transmission of diagnostics data over the cellular link, or it can suggest (e.g. by push notification) for the user to increase the data usage cap for the current predefined period of time to view the diagnostic data.

In some cases, once in the critical optimization data state, the system may only transmit alarms. In some cases, once in the critical optimization data state, the system will only transmit alarms to a designated primary CMS but not designated secondary CMS stations.

In some cases, once in the critical optimization data state, the system may increase the supervision interval between pings to reduce the data usage across the cellular link. In some cases, the system may analyze CMS response times for alarms and response time for supervision message for each CMS connected. Based on this analysis, the system may reveal how healthy each CMS is in terms of responding quicker, and based on that recommend a retry time period and timeout interval for each specific CMS. The system may also try different supervision intervals and find out what is the minimum supervision interval needed for the CMS, and the system can suggest that an installer select a supervision interval higher than that for that CMS.

In some cases, in the optimization data state and/or the critical optimization data state, repeated events (of the same type) for the same zone can be suppressed (e.g. like swinger suppression) to reduce data usage across the cellular link.

In some cases, event may be grouped, and only certain groups of events may be transmitted in the optimization data state and/or the critical optimization data state. For example, the events may be grouped based on event type such as Critical (e.g. alarms), Major (e.g. Bypass) and Minor (e.g. non-critical events), and only Critical event types may be transmitted when the system is in the critical optimization data state.

When in the critical optimization data state, and the data usage reaches a very critical threshold, the system may automatically authorize and obtain an increase in data usage for the current predetermined period of time and/or send a push notification to an authorized user indicating an immediate data recharge is needed.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for improving the reliability of a security system that includes an on-site security panel and an off-site central monitoring station (CMS), the security panel and the CMS communicating over a cellular communication connection that has a predefined cellular data usage cap over a predefined period of time, the method comprising:
   determining an amount of cellular communication data usage over the cellular communication connection since the beginning of the predefined period of time;
   determining a remaining amount of cellular communication data for the remainder of the predefined period of time based at least in part on the amount of cellular communication data usage over the cellular communication connection since the beginning of the predefined period of time and the predefined cellular data usage cap for the predefined period of time;
   determining whether a projected amount of cellular communication data usage is expected to exceed the predefined cellular data usage cap at or before the end of the predefined period of time based at least in part on the remaining amount of cellular communication data and how much time remains before the end of the predefined period of time; and
   in response to determining that the projected amount of cellular communication data usage is expected to exceed the predefined cellular data usage cap at or before the end of the predefined period of time, changing one or more operations of the security system to reduce the amount of cellular communication data usage by the security system.

2. The method of claim 1, wherein changing one or more operations of the security system to reduce the amount of cellular communication data usage by the security system comprises one or more of:
   reducing an amount of diagnostic data that is communicated over the cellular communication connection by the security system;
   reducing an amount of operational data that is communicated over the cellular communication connection by the security system; and
   reducing an amount of maintenance data that is communicated over the cellular communication connection by the security system.

3. The method of claim 2, wherein reducing the amount of diagnostic data comprises eliminating a type of diagnostic data that is communicated over the cellular communication connection by the security system.

4. The method of claim 2, wherein reducing the amount of operational data comprises eliminating a type of operational data that is communicated over the cellular communication connection by the security system.

5. The method of claim 2, wherein reducing the amount of maintenance data comprises eliminating a type of maintenance data that is communicated over the cellular communication connection by the security system.

6. The method of claim 1, wherein changing one or more operations of the security system to reduce the amount of cellular communication data usage by the security system comprises changing one or more communication parameters used by the security system when communicating over the cellular communication connection.

7. The method of claim 6, wherein changing one or more communication parameters comprises reducing a number or retries and/or increasing an interval between retries over the cellular communication connection before a communication is considered to have failed.

8. The method of claim 6, wherein changing one or more communication parameters comprises increasing an update interval for sending updated operational data over the cellular communication connection.

9. The method of claim 1, wherein the security system further comprises a cloud-based server, wherein the security panel and the cloud-based server communicate over the cellular communication connection that has the predefined cellular data usage cap over the predefined period of time.

10. The method of claim 1, comprising:
determining the projected amount of cellular communication data usage based at least in part on a historical record of past cellular communication data usage.

11. The method of claim 10, wherein determining the projected amount of cellular communication data usage is based at least in part on a machine learning model that is trained using the historical record of past cellular communication data usage.

12. The method of claim 1, further comprising:
transmitting one or more notifications to the off-site CMS, one or more of the notifications recommending one or more changes to an existing static configuration of the security system to change one or more operations of the security system to reduce the amount of cellular communication data usage by the security system.

13. A method for operating a security panel of a security system, wherein the security panel is in communication with an off-site central monitoring station (CMS) and/or a cloud-based server over a cellular communication connection that has a predefined cellular data usage cap over a predefined period of time, the method comprising:
the security panel determining an amount of cellular communication data usage over the cellular communication connection since the beginning of the predefined period of time;
the security panel determining a remaining amount of cellular communication data for the remainder of the predefined period of time based at least in part on the amount of cellular communication data usage over the cellular communication connection since the beginning of the predefined period of time and the predefined cellular data usage cap for the predefined period of time;
the security panel determining whether a projected amount of cellular communication data usage is expected to exceed the predefined cellular data usage cap at or before the end of the predefined period of time based at least in part on the remaining amount of cellular communication data and how much time remains before the end of the predefined period of time; and
in response to determining that the projected amount of cellular communication data usage is expected to exceed the predefined cellular data usage cap at or before the end of the predefined period of time, the security panel changing one or more operations of the security panel to reduce the amount of cellular communication data usage.

14. The method of claim 13, wherein changing one or more operations of the security panel to reduce the amount of cellular communication data usage comprises one or more of:
reducing an amount of diagnostic data that is communicated over the cellular communication connection;
reducing an amount of operational data that is communicated over the cellular communication connection; and
reducing an amount of maintenance data that is communicated over the cellular communication connection.

15. The method of claim 13, wherein changing one or more operations of the security panel to reduce the amount of cellular communication data usage comprises changing one or more communication parameters used by the security panel when communicating over the cellular communication connection.

16. The method of claim 13, comprising:
determining the projected amount of cellular communication data usage based at least in part on a historical record of past cellular communication data usage.

17. The method of claim 16, wherein determining the projected amount of cellular communication data usage is based at least in part on a machine learning model that is trained using the historical record of past cellular communication data usage.

18. The method of claim 16, wherein the security panel automatically changes one or more operations of the security panel to reduce the amount of cellular communication data usage.

19. The method of claim 13, further comprising:
the security panel transmitting one or more notifications to the off-site central monitoring stations (CMS) and/or the cloud-based server, one or more of the notifications recommending one or more changes to an existing static configuration of the security panel to change one or more operations of the security panel to reduce the amount of cellular communication data usage.

20. A non-transient computer readable medium storing instructions that when executed by one or more processors of a security system, cause the one or more processors to:
determine an amount of cellular communication data usage over a cellular communication connection between a security panel and one or more off-site central monitoring stations (CMS) and/or a cloud-based server since the beginning of a predefined period of time, wherein the cellular communication connection has a predefined cellular data usage cap over the predefined period of time;
determine a remaining amount of cellular communication data for the remainder of the predefined period of time based at least in part on the amount of cellular communication data usage over the cellular communication connection since the beginning of the predefined period of time and the predefined cellular data usage cap for the predefined period of time;

determine whether a projected amount of cellular communication data usage is expected to exceed the predefined cellular data usage cap at or before the end of the predefined period of time based at least in part on the remaining amount of cellular communication data and how much time remains before the end of the predefined period of time; and in response to determining that the projected amount of cellular communication data usage is expected to exceed the predefined cellular data usage cap at or before the end of the predefined period of time, automatically change or recommend a change to one or more operations of the security system to reduce the amount of cellular communication data usage by the security system.

\* \* \* \* \*